(12) United States Patent
Bandholz et al.

(10) Patent No.: US 6,754,835 B2
(45) Date of Patent: Jun. 22, 2004

(54) METHOD AND SYSTEM FOR PROVIDING POWER FAULT TOLERANCE IN A NETWORK OF CHAINED COMPUTER SYSTEMS THROUGH BIDIRECTIONAL LINKS

(75) Inventors: Justin Potok Bandholz, Apex, NC (US); Matthew S. Michaels, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 596 days.

(21) Appl. No.: 09/737,881

(22) Filed: Dec. 15, 2000

(65) Prior Publication Data

US 2002/0078387 A1 Jun. 20, 2002

(51) Int. Cl.⁷ .............................. G06F 1/26; G06F 1/30; H02J 1/10; H02J 3/06
(52) U.S. Cl. .......................... 713/300; 307/19; 307/64; 714/14
(58) Field of Search .......................... 713/300; 307/19, 307/64; 395/182.2, 750; 323/282; 714/4

(56) References Cited

U.S. PATENT DOCUMENTS

| | | | | |
|---|---|---|---|---|
| 4,659,942 A | * | 4/1987 | Volp | 307/19 |
| 5,266,838 A | * | 11/1993 | Gerner | 307/19 |
| 5,745,670 A | * | 4/1998 | Linde | 714/22 |
| 5,811,962 A | * | 9/1998 | Ceccherelli et al. | 323/282 |
| 6,153,946 A | * | 11/2000 | Koch et al. | 307/64 |
| 6,622,257 B1 | * | 9/2003 | Rollins et al. | 714/4 |

* cited by examiner

*Primary Examiner*—Thomas Lee
*Assistant Examiner*—Chi Whan Chung
(74) *Attorney, Agent, or Firm*—Sawyer Law Group

(57) ABSTRACT

A method and system for providing computer system for use in a network having a plurality of computer systems linked in a chain is disclosed. The method and system include providing a power supply, at least one input and at least one output for the computer system. The at least one input is for receiving power from a first portion of the plurality of computer systems and for providing power from the power supply to the first portion of the plurality of computer systems. The at least one output is for providing power from the power supply to a second portion of the plurality of computer systems and for receiving power from the second portion of the plurality of computer systems. In one aspect, the first portion of the plurality computer systems includes an upstream computer system and the second portion of the plurality computer systems includes a downstream computer system. In this aspect, the method and system also includes providing an input power control circuit and reverse current protection circuits for the computer system. The input power control circuit is coupled with the at least one input and is for controlling power provided to the computer system such that power is input to the computer system when the power supply does not function.

19 Claims, 4 Drawing Sheets

METHOD AND SYSTEM FOR PROVIDING POWER FAULT TOLERANCE IN A NETWORK OF CHAINED COMPUTER SYSTEMS THROUGH BIDIRECTIONAL LINKS

FIELD OF THE INVENTION

The present invention relates to computer systems, and more particularly to a method and system for allowing fault tolerance for power failures to be provided.

BACKGROUND OF THE INVENTION

FIG. 1 depicts a conventional network 1 including a master computer system 5 and conventional computer systems 10, 20 and 30 that are chained together. Although only three conventional computer systems 10, 20 and 30 are shown, the conventional network 1 will typically include a larger number of conventional computer systems (not shown). In addition, although separately depicted, the master computer system 5 could be the same as one of the conventional computer systems 10, 20 and 30. The conventional computer systems 10, 20 and 30 each include a power supply 12, 22 and 32, respectively and a system load 14, 24 and 34, respectively. Each of the conventional computer systems 10, 20 and 30 also includes an input 16, 26 and 36, respectively and an output 18, 28 and 38, respectively. For clarity, only one input 16,26 and 36 and one output 18, 28 and 38 is shown. However, typically the inputs 16, 26 and 36 and the outputs 18, 28 and 38 include multiple pins.

The conventional computer systems 10, 20 and 30 are chained together in the network 1. Thus, the output 18 and 28 of one computer system 10 and 20, respectively, is coupled to the input 26 and 36, respectively, of the next computer system 20 and 30, respectively. The conventional computer system 10, which has its output 18 coupled to the input 26 of the conventional computer system 20, is considered to be upstream of the conventional computer system 20. The conventional computer system 30, which has its input 36 coupled to the output 28 of the conventional computer system 20, is considered to be downstream of the conventional computer system 20. A conventional computer system 10, 20 or 30 communicates upstream via its input 16, 26 or 36, respectively, and communicates downstream via its output 18, 28 or 38, respectively.

The conventional master computer system 5 can controls portions of the remaining conventional computer systems 10, 20 and 30. In addition, the conventional computer systems 10, 20 and 30 can communicate with each other. In order to provide these functionalities, the system loads 14, 24 and 34 are used to communicate with and redrive signals from other conventional computer systems in the conventional network 1. Thus, the system loads 14, 24 and 34 are connected to the inputs 16, 26 and 36, respectively, and to the outputs 18, 28 and 38, respectively. For example, the system load 24 can be used to redrive signals from the upstream conventional computer system 10 to the downstream conventional computer system 30 as well as to drive signals from the downstream conventional computer system 30 to the upstream conventional computer system 10. The signals driven by the system loads 14, 24 and 34 can include both data and commands to the conventional computer systems 10, 20 and 30, respectively.

For example, each of the conventional computer systems 10, 20 and 30 may have a keyboard, a mouse and a monitor (not explicitly shown in FIG. 1). The conventional master computer system 5 can control the keyboard, video and mouse of the remaining conventional computer systems 10, 20 and 30 in the conventional network 1. Each of the computer systems 10, 20 and 30 thus may receive and send keyboard, video and mouse (KVM) signals through their outputs 18, 28 and 38 and receive or send KVM signals through their inputs 16, 26 and 36, respectively. The system loads 14, 24 and 34 may be used to redrive the KVM signals. The conventional master computer system 5 can control the operation of the keyboard, the video played on the monitor and the mouse of each of the remaining conventional computer systems 10, 20 and 30 through the KVM signals.

Although the conventional network 1 functions, one of ordinary skill in the art will readily recognize that the conventional network 1 is subject to failure due to failures of the power supplies 12, 22 and 32. As shown in FIG. 1, the power supplies 12, 22 and 32 are coupled to and provide power to the system loads 14, 24 and 34, respectively. Without power, the system loads 14, 24 and 34 cannot function properly. If the power supply 12, 22 or 32 fails, the system load 14, 24 or 34, respectively, cannot redrive signals from another conventional computer system or from the conventional master computer system 5. As a result, all downstream computer systems will be cut off from the remainder of the network 1. This could cause a major failure of the conventional network 1. For example, if the power supply 32 fails, only the conventional computer system 30 will be affected. However, if the power supply 12 fails then all of the conventional computer systems 20 and 30 will be cut off from the conventional master computer system 5. Thus, the failure of a single system 10 could adversely affect virtually the entire network 1.

Accordingly, what is needed is a system and method for providing fault tolerances for power failures in a computer system in a network composed of chained computer systems. The present invention addresses such a need.

SUMMARY OF THE INVENTION

The present invention provides a method and system for providing computer system for use in a network having a plurality of computer systems linked in a chain. The method and system comprise providing a power supply, at least one input and at least one output for the computer system. The at least one input is for receiving power from a first portion of the plurality of computer systems and for providing power from the power supply to the first portion of the plurality of computer systems. The at least one output is for providing power from the power supply to a second portion of the plurality of computer systems and for receiving power from the second portion of the plurality of computer systems. In one aspect, the first portion of the plurality computer systems provides an upstream computer system and the second portion of the plurality computer systems includes a downstream computer system. In this aspect, the method and system also comprise providing an input power control circuit and a reverse current protection circuits for the computer system. The input power control circuit is coupled with the at least one input and is for controlling power provided to the computer system such that power is input to the computer system when the power supply does not function. According to the system and method disclosed herein, the present invention allows computer systems in a network to share power. Thus, the reliability of the network is improved.

DETAILED DESCRIPTION OF THE INVENTION

The present invention relates to an improvement in networks including chained computer systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for providing computer system for use in a network having a plurality of computer systems linked in a chain. The method and system comprise providing a power supply, at least one input and at least one output for the computer system. The at least one input is for receiving power from a first portion of the plurality of computer systems and for providing power from the power supply to the first portion of the plurality of computer systems. The at least one output is for providing power from the power supply to a second portion of the plurality of computer systems and for receiving power from the second portion of the plurality of computer systems. In one aspect, the first portion of the plurality computer systems provides an upstream computer system and the second portion of the plurality computer systems includes a downstream computer system. In this aspect, the method and system also comprise providing an input power control circuit and a reverse current protection circuits for the computer system. The input power control circuit is coupled with the at least one input and is for controlling power provided to the computer system such that power is input to the computer system when the power supply does not function.

The present invention will be described in terms of particular networks and computer systems driving certain signals. However, one of ordinary skill in the art will readily recognize that this method and system will operate effectively for other networks and other computer systems which drive other signals. The present invention is also described in the context of certain circuits having particular components. However, one of ordinary skill in the art will readily recognize that other circuits providing the same functionality can be used. Furthermore, for clarity, the present invention is described in the context of computer systems having certain components. However, one of ordinary skill in the art will readily realize that computer systems having other or additional components can be utilized.

Figure 1:
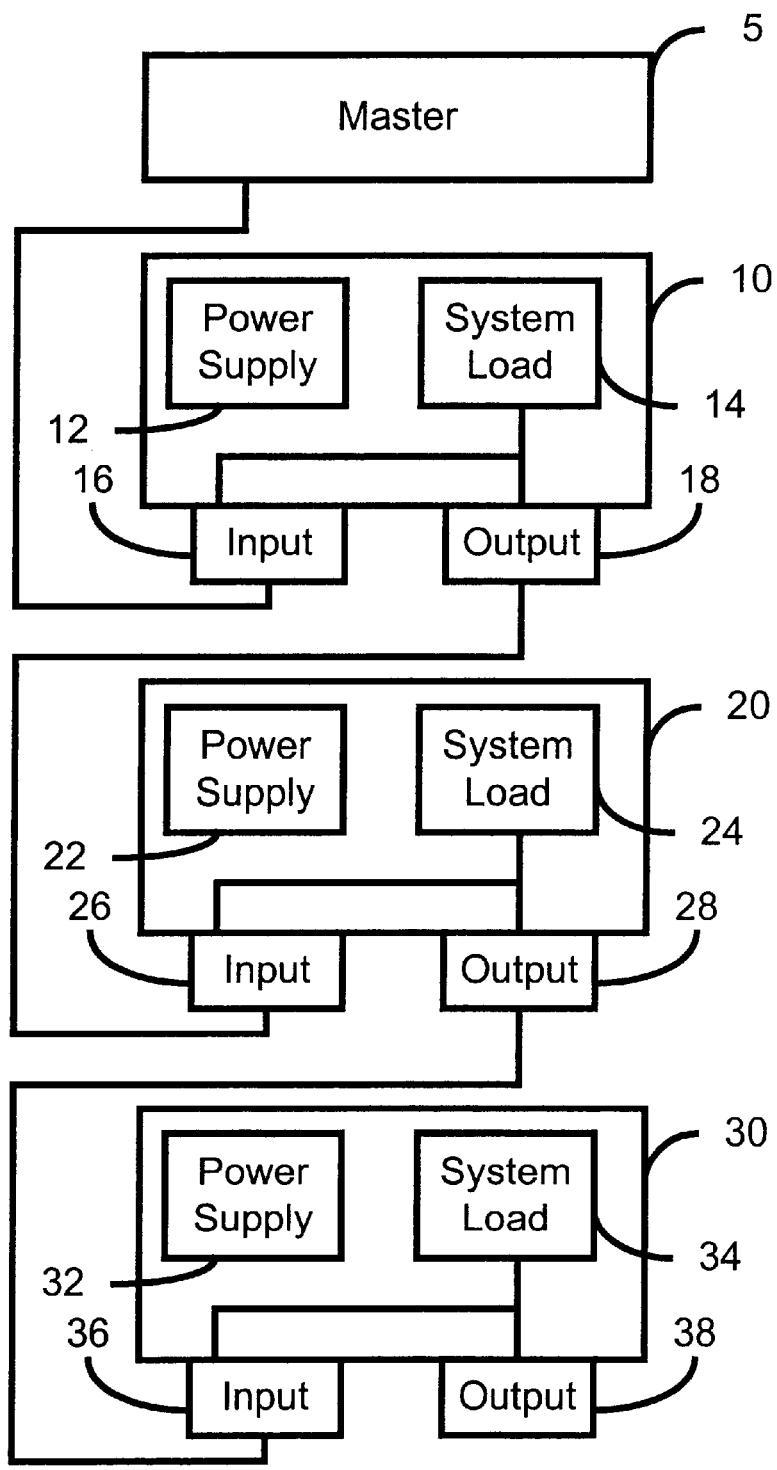
FIG. 1 is a block diagram of a conventional chained network.
Figure 2:
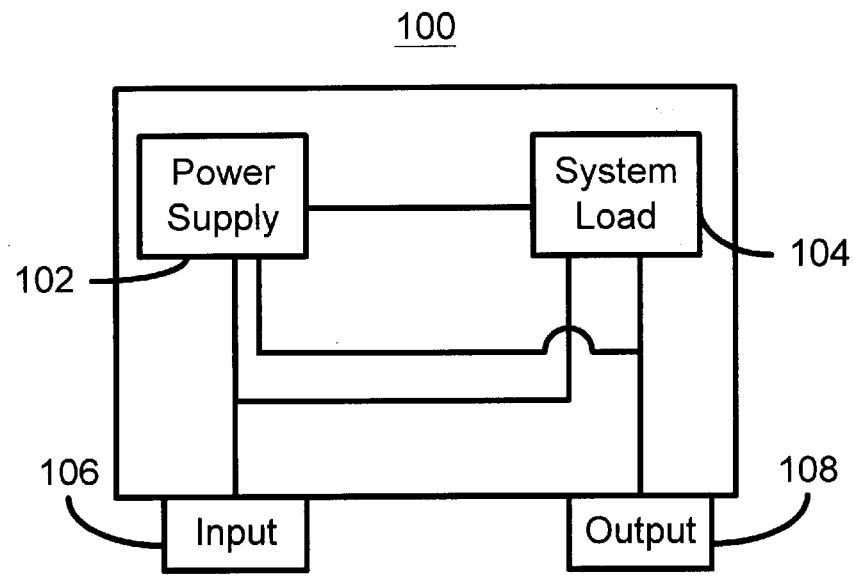
FIG. 2 is high level a block diagram of one embodiment of a computer system in accordance with the present invention.

To more particularly illustrate the method and system in accordance with the present invention, refer now to FIG. 2, depicting one embodiment of a computer system 100 in accordance with the present invention. The computer system 100 includes a power supply 102 and system load 104. The power supply 102 preferably supplies a voltage of five volts. Among other functions, the system load 104 redrives signals from upstream or downstream computer systems (not shown). The computer system 100 also includes input 106 and output 108. The power supply 102, the system load 104, the input 106 and the output 108 are analogous to the power supply 12, the system load 14, the input 16, and the output 18 depicted in FIG. 1. Referring back to FIG. 2, although only one input 106 and one output 108 are depicted, the computer system 100 possibly has multiple input pins and multiple output pins. However, for clarity, only the portions of the input 106 and output 108 used in sharing power, as described below, are depicted. The input 106 can receive signals from and send signals to an upstream computer system (not shown). The output 108 can send signals to and receive signals from a downstream computer system (not shown). The computer system also redrives signals to or from upstream and downstream computer systems. Thus, the input 106 and the output 108 are both connected to the system load 104. In addition, the input 106 and output 108 are coupled to the power supply 102. The power supply 102 provides power for the system load 104. Thus, the system load 104 redrives signals upstream and downstream in a network. Thus, the computer system 100 can perform much the same functions as the conventional computer systems 10, 20 or 30 depicted in FIG. 1.

In addition, the computer system 100 can provide fault tolerance for power failures. Because of the connection between the power supply 102, the system load 104, the input 106 and the output 108, power from the power supply 102 can be shared with multiple computer systems. Power can be provided from the power supply 102 to an upstream computer system through the input 106. Similarly, power can be provided from the power supply 102 to a downstream computer system via the output 108. Power can be received by the computer system 100 through the input 106 or the output 108 and provided to the system load 104. In a preferred embodiment, power is only received in the input 106 and output 108 when the power supply 102 does not provide sufficient power to the system load 104. In addition, in a preferred embodiment, power is provided from the power supply 102 to an up stream and/or downstream computer system (not shown) when the power supply (not shown) for that computer system fails. Thus, the failure of a single power supply in an upstream or downstream computer system may not adversely affect performance of a network in which the computer system 100 is used. Furthermore, because the computer system 100 can accept power from other computer systems via the input 106 and the output 108 failure of the power supply 102 may not prevent the system load 104 from functioning. In particular, power can be provided from the input 106 and the output 108 in the event that power supply 102 fails. Consequently, the system load 104 can function to redrive signals in the event that the computer system 100 does not have the working internal power supply 102.

Figure 3:
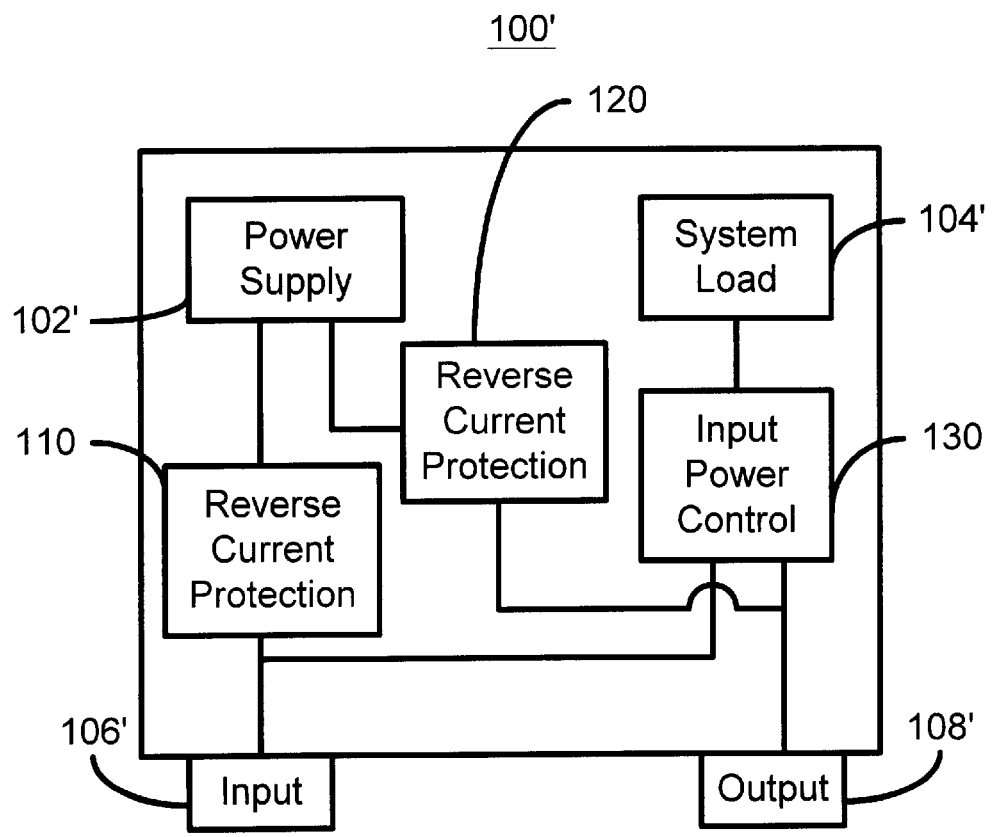
FIG. 3 is a more detailed block diagram of one embodiment of a computer system in accordance with the present invention.

FIG. 3 depicts a more detailed block diagram of one embodiment of a computer system 100' in accordance with the present invention. The computer system 100' includes many of the same components as the computer system 100 depicted in FIG. 2. Thus, components of the system 100' are labeled similarly to some components of the computer system 100. For example, the computer system 100' includes a power supply 102', a system load 104', an input 106' and output 108' which are analogous to the power supply 102, the system load 104, the input 106 and the output 108 depicted in FIG. 2. Referring back to FIG. 3, although only one input 106' and one output 108' are depicted, the computer system 100' possibly has multiple input pins and multiple output pins. However, for clarity, only the portions of the input 106' and output 108' used in sharing power, as described below, are depicted. The input 106' can receive signals from and send signals to an upstream computer system (not shown). The output 108' can send signals to and receive signals from a downstream computer system (not shown). The power supply 102' preferably supplies a voltage of five volts. Among other functions, the system load 104' redrives signals from upstream or downstream computer systems (not shown). The computer system 100' also includes a first reverse current protection circuit 110 and a second reverse current protection circuit 120 and an input power control circuit 130. The input power control circuit 130 is coupled with the input 106' and the output 108'.

Power can be provided to the computer system 100' through the input 106' and the output 108'. In addition, the computer system 100' can provide power to other computer systems through the input 106' and the output 108'. In order to control power provided to the computer system 100', the input power control circuit 130 is used. The input power control circuit 130 ensures that power is provided in to the computer system 100' only when the power supply 102' is not functioning. Thus, when the computer system 100' is working normally the power supply 102' provides power to the system load 104'. In a preferred embodiment, the input power control circuit 130 also suppresses noise.

The first reverse current protection circuit 110 helps to ensure that current is not inadvertently provided from the input 106' to the power supply 102'. The second reverse current protection circuit 120 helps to ensure that current is not inadvertently provided from the output 108' to the power supply 102'. In a preferred embodiment, the first reverse current protection circuit 110 and the second reverse current protection circuit 120 also suppress noise.

Thus, the computer system 100' provides fault tolerance for failures of the power supply 102' in a network. When the power supply 102' fails, the input power control circuit 130 allows power to be provided to the computer system 100' and from other computer systems (not shown) with which the computer system 100' is coupled. In a preferred embodiment, the computer system 100' receives power from an upstream computer system as adjacent to the computer system 100' and from a downstream computer system that is adjacent to the computer system 100'. The power received from the upstream computer system would be received via the input 106', while power received from the downstream computer system would be received via the output 108'. Because of the input power control circuit 130, this power can only be received via the input 106' and the output 108' when the power supply 102' fails. Thus, the network (not shown) is protected for failures of the power supply 102'. In addition, the power supply 102' can provide power to an upstream computer system and/or downstream computer system through the input 106' and/or the output 108', respectively. Thus, the network is protected against failures of the power supplies and other computer systems. In addition, the computer system 100' is protected from reverse current, using the first reverse current protection circuit 110 and the second reverse current protection circuit 120.

Figure 4:
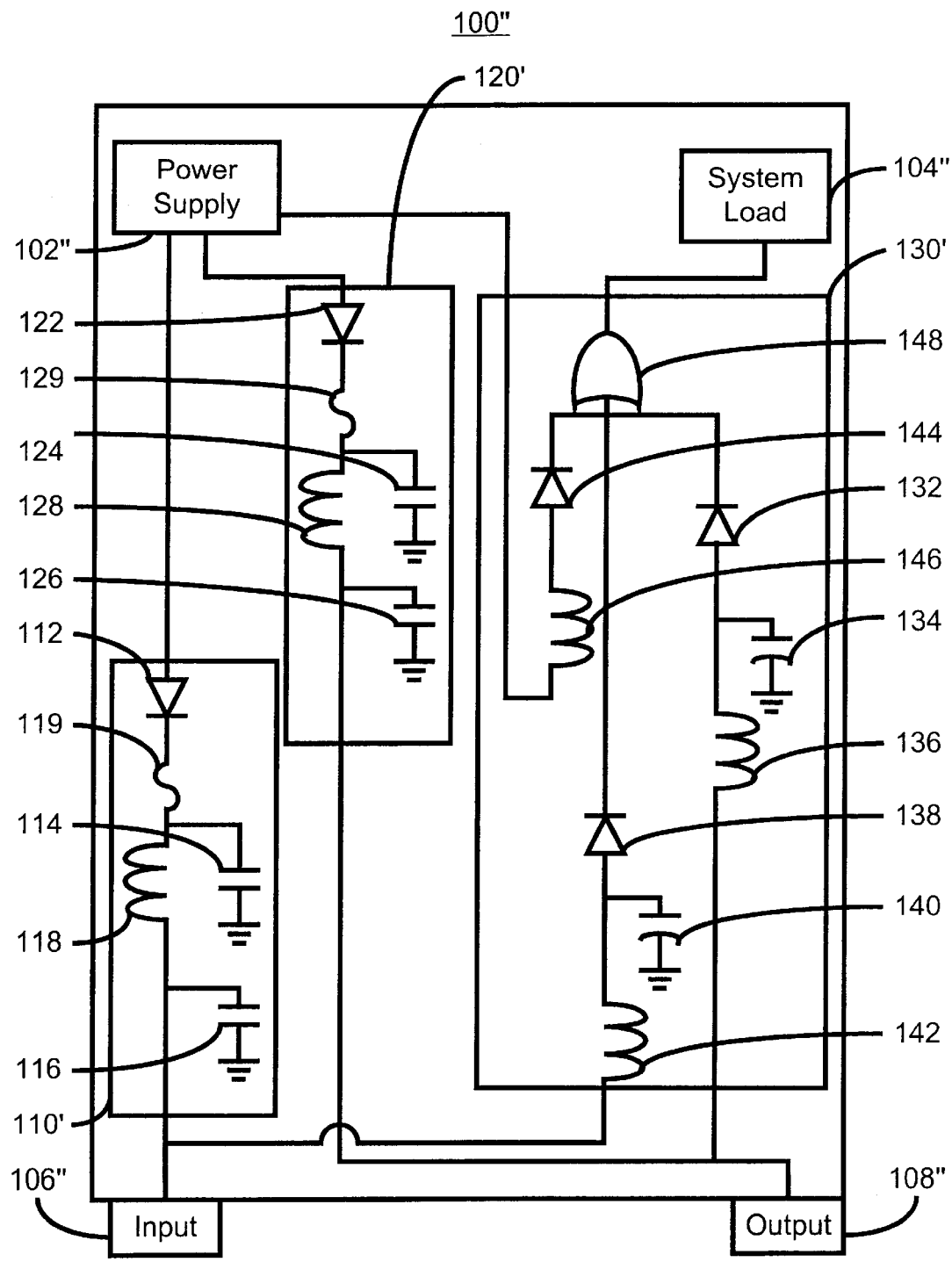
FIG. 4 is a more detailed block diagram of a preferred embodiment of a computer system in accordance with the present invention.

FIG. 4 is a more detailed block diagram of a preferred embodiment of a computer system 100" in accordance with the present invention. The computer system 100" has many of the same components as the computer systems 100 and 100'. Consequently, many the components of the computer system 100" are labeled similarly. For example, the computer system 100" includes a power supply 102", a system load 104", an input 106" and output 108" which are analogous to the power supply 102, the system load 104, the input 106 and the output 108 depicted in FIG. 2. Similarly, the computer system 100" includes a first reverse current protection circuit 110' and a second reverse current protection circuit 120' and an input power control circuit 130' that are analogous to the first reverse current protection circuit 110 and the second reverse current protection circuit 120 and the input power control circuit 130 depicted in FIG. 3. Referring back to FIG. 4, although only one input 106" and one output 108" are depicted, the computer system 100" possibly has multiple input pins and multiple output pins. Preferably, the input 106" and output 108" each have twenty-eight pins. However, for clarity, only the portions of the input 106" and output 108" used in sharing power, as described below, are depicted. The input 106" can receive signals from and send signals to an upstream computer system (not shown). The output 108" can send signals to and receive signals from a downstream computer system (not shown). The power supply 102" preferably supplies a voltage of five volts. Among other functions, the system load 104" redrives signals from upstream or downstream computer systems (not shown).

FIG. 4 depicts the preferred first reverse current protection circuit 110', the second reverse current protection circuit 120' and the preferred input power control circuit 130'. The first reverse current protection circuit 110' includes a diode 112, capacitors 114 and 116, an inductor 118 and a thermistor 119. The diode 112 is preferably a 0.3 volt diode and is biased to prevent current which enters from the input 106" from reaching the power supply 102". Thus, the circuit 110' helps to prevent damage to the computer system 100" from current entering the input 106". The thermistor 119 aids in preventing damage due to overcurrent, for example from a short circuit at the input 106". The inductor 118 and the capacitors 114 and 116 form a pi filter, which helps to reduce noise.

The second reverse current protection circuit 120' functions in substantially the same way as the first reverse current protection circuit 110', but performs its functions for the output 108" rather than the input 106". Thus, the second reverse current protection circuit 120' includes a diode 122, capacitors 124 and 126, an inductor 128 and a thermistor 129. The diode 122 is preferably a 0.3 volt diode and is biased to prevent current which enters from the output 108" from reaching the power supply 102". Thus, the circuit 120' helps to prevent damage to the computer system 100" from current entering the output 108". The thermistor 129 aids in preventing damage due to overcurrent, for example from a short circuit at the output 108". The inductor 128 and the capacitors 124 and 126 form a pi filter, which helps to reduce noise.

The input power control circuit 130' includes a diode 132, a capacitor 134 and an inductor 136 coupled to the output 108". The input power control circuit 130' also includes a diode 138, a capacitor 140 and an inductor 142 coupled to the input 106". In addition, the input power control circuit 130' includes a diode 144, an inductor 146 and an OR 148. The OR 148 is preferably a five volt OR. The OR 148 is preferably a "dot-OR" or "wire-OR" in which the diodes 132, 138 and 144 are wired together to achieve a logical OR. The diode 144 and the inductor 146 are coupled to the power supply 102". The capacitor 134 and inductor 136 are used to suppress noise from the output 108". Similarly, the capacitor 140 and inductor 142 are used to suppress noise from the input 106". The inductor 146 is used to suppress noise from the power supply 102".

The diodes 132, 138 and 144 are used to control whether power is provided internally, from the power supply 102" or from other computer systems (not shown), via the input 106" and output 108". The computer system 100" is preferably used with computer systems that are identical to the computer system 100" in terms of power sharing. Thus, the diodes 132, 138 and 144 are used in conjunction with a diode corresponding to the diode 122 that is in an upstream computer system (not shown) adjacent to the computer system 100" and a diode corresponding to the diode 112 that is in a downstream computer system (not shown) adjacent to the computer system 100". The diodes 132, 138 and 144 are preferably 0.3 volt diodes.

The voltage provided from the power supply 102" undergoes a single (preferably 0.3 volt) voltage drop due to the diode 144. The upstream computer system is preferably the same as the computer system 100". Thus, the voltage from the power supply of the upstream computer system undergoes two voltage drops, each drop preferably being 0.3 volts. The first voltage drop is from the diode in the upstream computer system that corresponds to the diode 122. The second voltage drop is from the diode 138. Similarly, the downstream computer system is preferably the same as the computer system 100". Thus, the voltage from the power supply of the downstream computer system undergoes two voltage drops, each drop preferably being 0.3 volts. The first voltage drop is from the diode in the downstream computer system that corresponds to the diode 112. The second voltage drop is from the diode 132. Thus, the voltage provided via the input 106" and the output 108" each undergo a total voltage drop of 0.6 volts. Because the voltage drop for the power supply 102" is lower, when the power supply 102" is functioning, the power supply 102" will supply power to the system load 104" through the OR 148. However, when the power supply 102" is not functioning, then power will be drawn from the sources having higher drops. Thus, power will be drawn through the input 106" from the power supply of the upstream computer system and/or through the output 108" from the power supply of the downstream computer system and then through the OR 148. As a result, the computer system 100" only draws power from one or more neighboring computer systems when its own power supply 102" does not function.

Similarly, the power supply 102" can provide power to an upstream computer system connected to the input 106" and/or to a downstream computer system connected to the output 108". As stated above, the upstream and downstream computer systems are preferably substantially the same as the computer system 100" for the purposes of power sharing. When the power supply of the upstream and/or downstream computer system functions, the voltage drop for the upstream and/or downstream computer system's power supply has the smallest drop. This is because the voltage drop due to the diode 112 and/or 122 of the computer system 100" and the diode of the upstream and/or downstream computer system that corresponds to the diode 132 and/or 138 is larger than the voltage drop for the upstream and/or downstream computer system's diode corresponding to the diode 144. Thus, the upstream and/or downstream computer system will draw power from its own internal power supply. When the power supply of the upstream and/or downstream computer system does not function, then power will be drawn from the power supply 102". Thus, the power supply 102" can provide power through the input 106" and/or the output 108" to the upstream and/or downstream computer system only when needed.

Thus, the computer system 100" provides many of the same benefits as the power supplies 102 and 102'. The computer system 100" only draws power from one or more neighboring computer systems. The computer system 100" has a relatively simple circuit 130' for controlling whether power is input to the computer system 100" from neighboring computer systems via the input 106" and/or the output 108'. Furthermore, the computer system 100" has relatively simple reverse current protection circuits 110' and 120'. The computer system 100" also can reduce noise input to the computer system 100" from the power supplies of other computer systems and reduce the noise from its own power supply 102" using the circuits 110', 120' and 130'.

Figure 5:
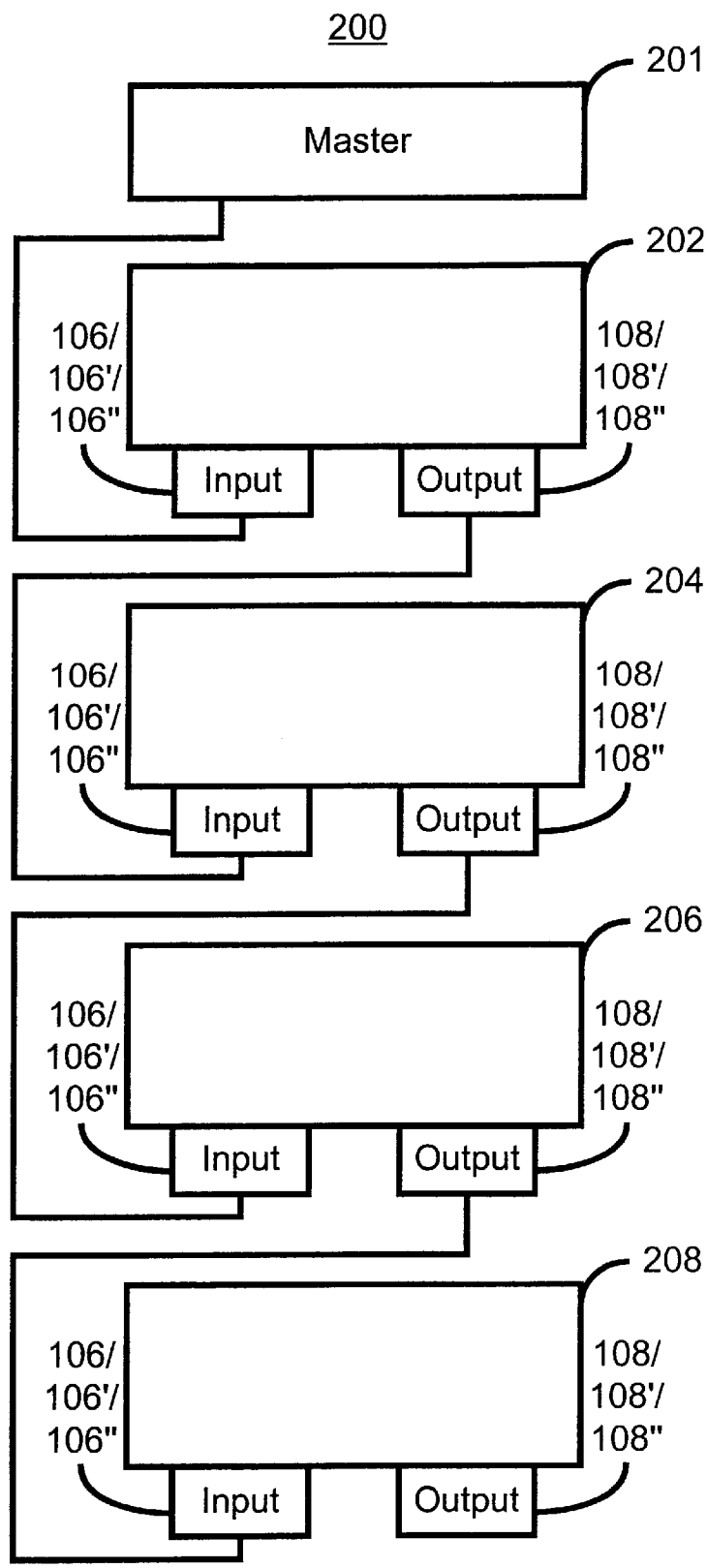
FIG. 5 is a block diagram of one embodiment of a network using embodiments of the computer system in accordance with the present invention.

FIG. 5 depicts one embodiment of a network 200 utilizing the computer system 100, 100' or 100" in accordance with the present invention. The computer system 200 includes four computer system 202, 204, 206 and 208. The computer systems 202, 204, 206 and 208 are each a computer system 100, 100' or 100" in accordance with the present invention. Although only four computer systems 202, 204, 206 and 208 are shown, the network 200 will generally include a larger number of computer systems 202, 204, 206 and 208. The computer system 200 also includes a master system 201. Although not depicted similarly, the master system 201 might be a computer system 100, 100' or 100". Because the computer systems 202, 204, 206 and 208 have the properties described above for the computer systems 100, 100' or 100", the network 200 has a higher tolerance for power failures. In a preferred embodiment, which uses the computer system 100", three computer systems 100" must fail before a portion of the network 200 is cut off due to a power failure. For example, if the computer system 204 has a power failure, it will draw power through its output from the next computer system 206 and through its input from the computer system 202. Thus, the remaining computer systems 206 and 208 will not be cut off from the master computer system 201. If the computer system 206 also fails, the computer system 204 can still draw power from the computer system 202, while the computer system 206 can draw power from the computer system 208. Only when a third computer system, such as the computer system 202, fails will the computer system 204 be without power. Thus, the remaining computer system 206 and 208 will be cut off from the master system 201. Consequently, the network 200 has a significantly higher tolerance for failures of the internal power supplies of the computer systems 202, 204, 206 and 208 because the computer system 100, 100' or 100" in accordance with the present invention are used.

A method and system has been disclosed for providing fault tolerances for power failures in a network including chained computer systems. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer system for use in a network having a plurality of computer systems linked in a chain, the computer system comprising:

a power supply;

at least one input for receiving power from a first portion of the plurality of computer systems and providing power from the power supply to the first portion of the plurality of computer systems;

at least one output for providing power from the power supply to a second portion of the plurality of computer systems and for receiving power from the second portion of the plurality of computer systems; and a first noise control circuit coupled with the at least one input or the at least one output, the first noise control circuit for controlling noise from an upstream computer system or a downstream computer system and including a first inductor coupled in parallel with a first capacitor.

2. The computer system of claim 1 wherein the at least one input is capable of receiving power from the upstream computer system and providing power to the upstream computer system and wherein the at least one output is capable of providing power to a downstream computer system and receiving power from the downstream computer system.

3. The computer system of claim 1 further comprising:

an input power control circuit coupled with the at least one input and with the at least one output for controlling power provided to the computer system.

4. The computer system of claim 3 wherein the computer system is coupled to an upstream computer system and to a downstream computer system and wherein the input power control circuit further includes:

a second noise control circuit coupled with the at least one output, the second noise control circuit for controlling noise from the downstream computer system and wherein the first noise control circuit is coupled with the at least one input and is for controlling noise from the upstream computer system only.

5. The computer system of claim 3 wherein the input power control circuit further includes a first diode coupled with the upstream computer system, a second diode coupled with the downstream computer system, a third diode coupled with the power supply and an OR having a plurality of inputs, the plurality of inputs to the OR being coupled with the first diode, the second diode and the third diode.

6. A computer system for use in a network having a plurality of computer systems linked in a chain, the computer system comprising:

a power supply;

at least one input for receiving power from a first portion of the plurality of computer systems and providing power from the power supply to the first portion of the plurality of computer systems;

at least one output for providing power from the power supply to a second portion of the plurality of computer systems and for receiving power from the second portion of the plurality of computer systems; and an input power control circuit coupled with the at least one input and with the at least one output for controlling power provided to the computer system, wherein the input power control circuit further includes a first noise control circuit coupled with the at least one input and a second noise control circuit coupled with the at least one input, the first noise control circuit for controlling noise from an upstream computer system connected with the computer system and the second noise control circuit for controlling noise from a downstream computer system connected with the computer system;

wherein the first noise control circuit further includes a first inductor coupled in parallel with a first capacitor wherein the second noise control circuit includes a second inductor coupled in parallel with a second capacitor.

7. The computer system of claim 6, further including a first reverse current protection circuit coupled with the at least one input and the power supply; and a second reverse current protection circuit coupled with the at least one output and the power supply.

8. The computer system of claim 7, wherein the first reverse current protection circuit further includes a first pi filter for filtering noise from the at least one input and a first thermistor for protecting against damage due to an overcurrent and wherein the second reverse current protection circuit further includes a second pi filter for filtering noise from the at least one output and a second thermistor for protecting against damage due to an overcurrent.

9. A computer system for use in a network having a plurality of computer systems linked in a chain, the computer system comprising:

a power supply;

at least one input coupled with the power supply, the at least one input for receiving power from an upstream computer system of the plurality of computer systems upstream in the chain and for providing power to the upstream computer system;

at least one output coupled with the power supply, the at least one output for providing power to a downstream computer system of the plurality of computer systems upstream in the chain and for providing power to the downstream computer system of the plurality of computer systems;

an input power control circuit coupled with the at least one input and with the at least one output, the input power control circuit for controlling power provided to the computer system such that power is input to the computer system when the power supply does not function;

a first reverse current control circuit coupled with the at least one input; a second reverse current control circuit coupled with the at least one output; and a first noise control circuit coupled with the at least one input or the at least one output, the first noise control circuit for controlling noise from an upstream computer system or a downstream computer system and including a first inductor coupled in parallel with a first capacitor.

10. A network comprising:

a plurality of computer systems chained together, each of the plurality of computer systems including a power supply, at least one input and at least one output, the at least one input for receiving power from a first portion of the plurality of computer systems and providing power from the power supply to the first portion of the plurality of computer systems and the at least one output for providing power from the power supply to a second portion of the plurality of computer systems and for receiving power from the second portion of the plurality of computer systems;

wherein each of the plurality of computer systems further includes a first noise control circuit coupled with the at least one input or the at least one output, the first noise control circuit for controlling noise from an upstream computer system or a downstream computer system and including a first inductor coupled in parallel with a first capacitor.

11. A method for providing power to a computer system for use in a network having a plurality of computer systems linked in a chain, the computer system including a power supply, at least one input and at least one output, the method comprising the steps of:

(a) receiving power from a first portion of the plurality of computer systems through the input and receiving power from a second portion of the plurality of computer systems through the output if the power supply of the computer system does not provide power to the computer system;

(b) providing power from the power supply to the first portion of the plurality of computer systems through the input if the first portion of the plurality of computer systems does not have power; and (c) providing power for the power supply to a second portion of the plurality of computer systems through the output if the second portion of the plurality of computer systems does not have power;

wherein the computer system further includes a first noise control circuit coupled with the at least one input or the at least one output, the first noise control circuit for controlling noise from an upstream computer system or a downstream computer system and including a first inductor coupled in parallel with a first capacitor.

12. The method of claim 11 wherein the first portion of the plurality of computer systems includes the upstream computer system and wherein the second portion of the plurality of computer systems includes a downstream computer system.

13. The method of claim 11 wherein the power receiving step (a) further includes the step of receiving power through an input power control circuit coupled with the at least one input and with the at least one output, the input power control circuit for controlling power provided to the computer system.

14. The method of claim 13 wherein the input power control circuit further includes:

a second noise control circuit coupled with the at least one input, the second noise control circuit for controlling noise from the downstream computer system; and wherein the first noise control circuit is coupled with the at least one input and is for controlling noise from the upstream computer system only.

15. A method for providing power to a computer system for use in a network having a plurality of computer systems linked in a chain, the computer system including a power supply, at least one input and at least one output, the method comprising the steps of:

(a) receiving power from a first portion of the plurality of computer systems through the input and receiving power from a second portion of the plurality of computer systems through the output if the power supply of the computer system does not provide power to the computer system, wherein the power receiving step (a) further includes the step of receiving power through an input power control circuit coupled with the at least one input and with the at least one output, the input power control circuit for controlling power provided to the computer system;

(b) providing power from the power supply to the first portion of the plurality of computer systems through the input if the first portion of the plurality of computer systems does not have power; and (c) providing power for the power supply to a second portion of the plurality of computer systems through the output if the second portion of the plurality of computer systems does not have power;

wherein the computer system further includes a second noise control circuit coupled with the at least one input, the second noise control circuit for controlling noise from the downstream computer system;

wherein the first noise control circuit further includes a first capacitor coupled in parallel with a first inductor; and wherein the second noise control circuit includes a second capacitor coupled in parallel with a second inductor.

16. The method of claim 15 wherein upstream power providing step (b) further includes the step of:

(b1) providing power to the upstream computer system through a first reverse current protector coupled with the first noise control circuit and the power supply.

17. The method of claim 16 wherein the downstream power providing step (c) further includes the step of:

(c1) providing power to the downstream computer system through a second reverse current protector coupled with the second noise control circuit and the power supply.

18. The system of claim 17 wherein the first reverse current protection circuit further includes a first pi filter for filtering noise from the at least one input and a first thermistor for protecting against damage due to an overcurrent and wherein the second reverse current protection circuit further includes a second pi filter for filtering noise from the at least one output and a second thermistor for protecting against damage due to an overcurrent.

19. The method of claim 15 wherein the input power control circuit further includes a first diode coupled with the upstream computer system, a second diode coupled with the downstream computer system, a third diode coupled with the power supply and an OR having a plurality of inputs, the plurality of inputs to the OR being coupled with the first diode, the second diode and the third diode.

* * * * *